2 Sheets—Sheet 1.

G. ESTERLY.

Assignor of one-half interest to B. KUHNS.

Broadcast Seeder and Cultivator.

No. 8,385. Reissued Aug. 20, 1878.

Witnesses

Alfred A. Clerks.

E. N. Gallagher

Inventor

George Esterly by Wood & Boyd

Attorneys

2 Sheets—Sheet 2.

G. ESTERLY.

Assignor of one-half interest to B. KUHNS.

Broadcast Seeder and Cultivator.

No. 8,385. Reissued Aug. 20, 1878.

Inventor
George Esterly
By Wood & Boyd
Attorneys

Witness
Charles C. Wilson
C. M. Gallagher

UNITED STATES PATENT OFFICE.

GEORGE ESTERLY, OF WHITEWATER, WISCONSIN, ASSIGNOR OF ONE-HALF INTEREST TO BENJAMIN KUHNS.

IMPROVEMENT IN BROADCAST SEEDER AND CULTIVATOR.

Specification forming part of Letters Patent No. 79,332, dated June 30, 1868; Reissue No. 8,385, dated August 20, 1878; application filed June 20, 1878.

*To all whom it may concern:*

Be it known that I, GEORGE ESTERLY, of Whitewater, in the county of Walworth and State of Wisconsin, have invented a new and Improved Broadcast Seeder and Cultivator; and I do hereby declare that the following is a full, clear, and exact description thereof, reference being had to the accompanying drawings, making a part of this specification, in which—

Figure 1:
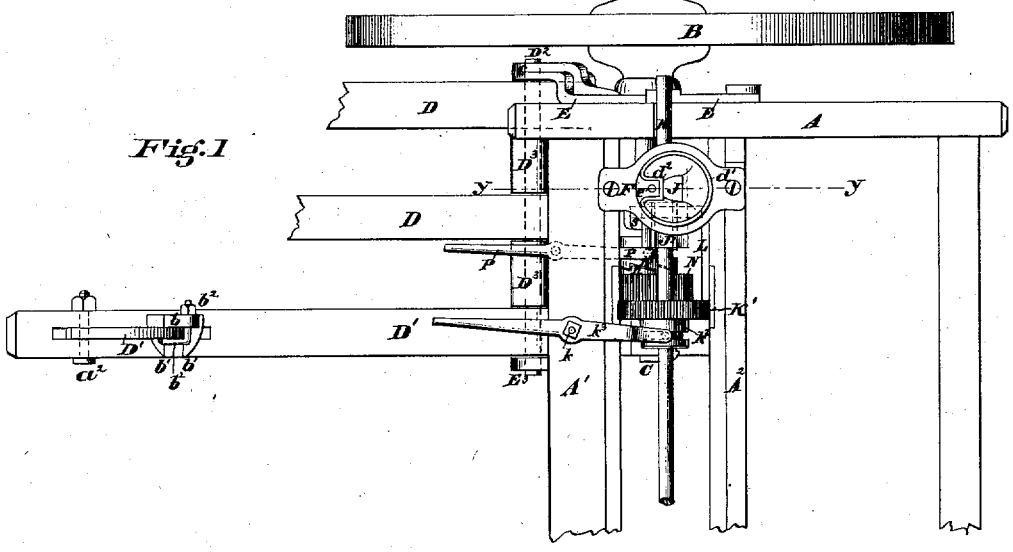
Figure 2:
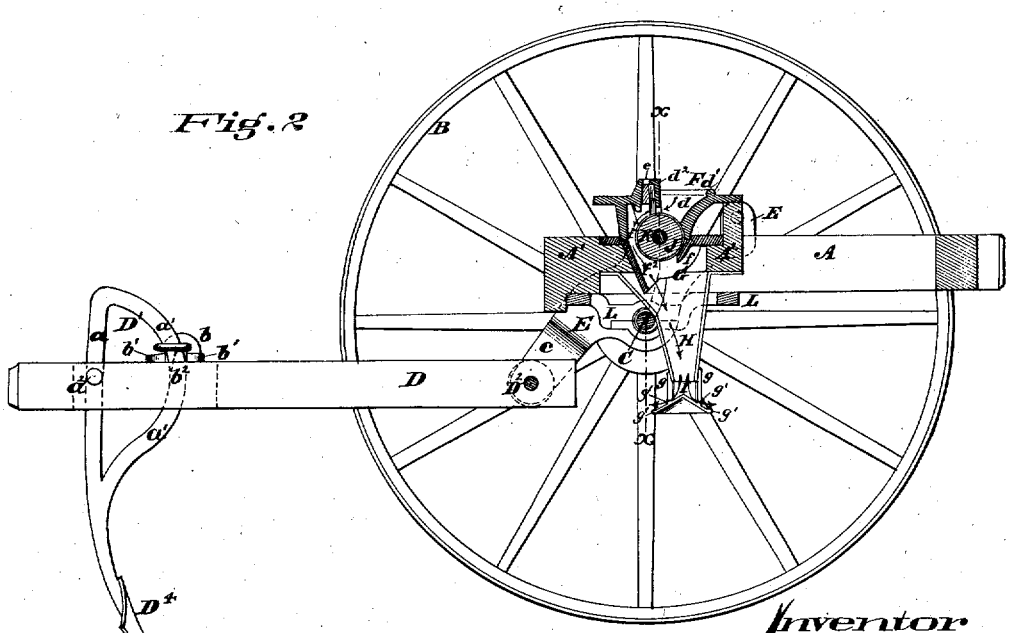
Figure 3:
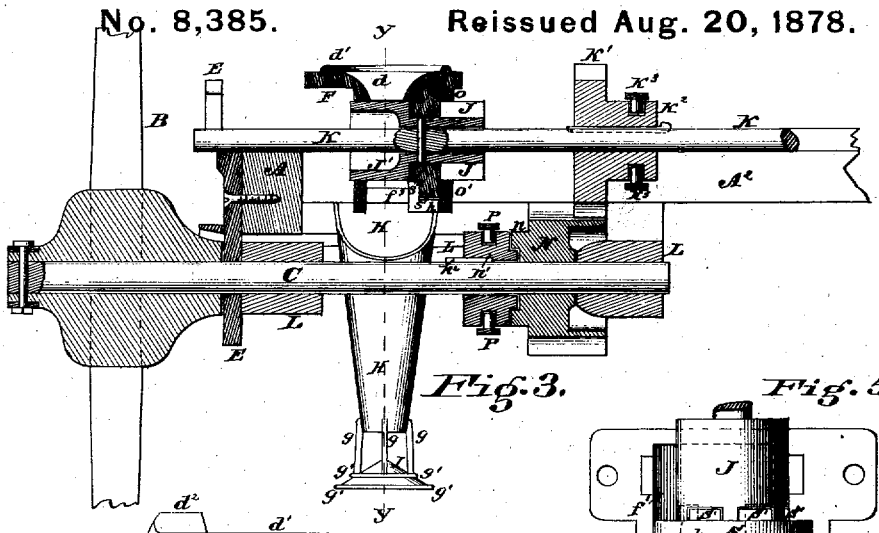
Figure 5:
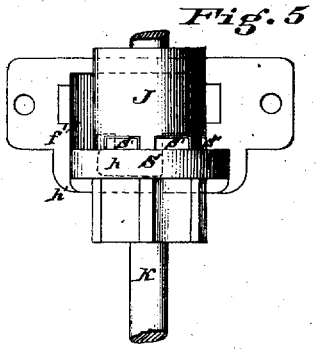
Figure 4:
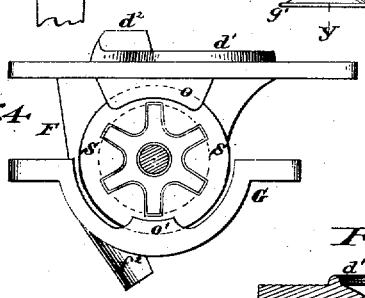
Figure 6:
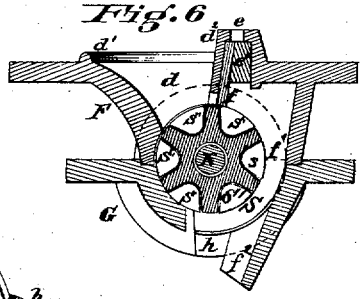
Figure 7:
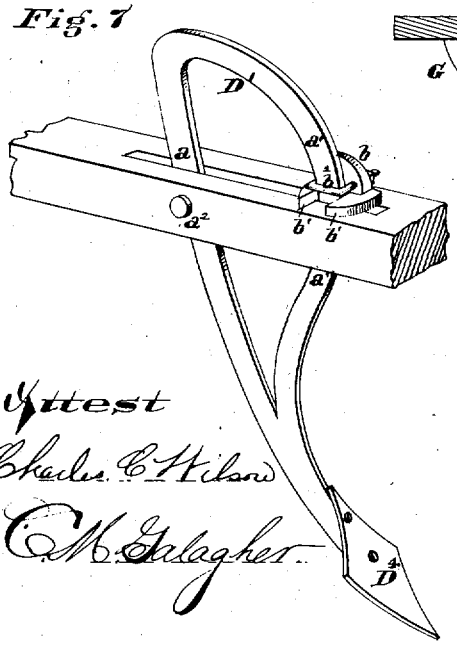

Figure 1 is a top view, in detail, of one side of the improved machine, showing the bottom of the seed-cup closed by the cylinder of the discharging device. Fig. 2 is a longitudinal section taken in the vertical plane indicated by line *y* in Fig. 1. Fig. 3 is a vertical section taken through the machine, as indicated by the course of line *x x* in Fig. 2. Figs. 4, 5, and 6 represent the construction of the seed-cup and discharging device. Fig. 7 is a perspective view of one of the hoes and its fastenings.

Similar letters of reference indicate corresponding parts in the several figures.

This invention relates to certain novel improvements in seeding-machines.

My invention consists, first, in a secondary hopper or seed-cup having a distributing-wheel, supported by bearings within the seed-cup, in combination with devices for shifting said wheel laterally for regulating the sowing capacity of the said seed-cup, as will be hereinafter more particularly described; second, in a secondary hopper or seed-cup supporting a seed-wheel turning on bearings in said hopper, and having a laterally-moving cut-off to widen or narrow the carrying-surfaces of the distributing-wheel; third, in a secondary hopper or seed-cup, in combination with a rotating laterally-adjustable distributing-wheel arranged within said hopper or cup, and a rotary shaft connected with and passing through the center of said wheel, whereby rotary motion may be communicated to said distributing wheel by means of intermediate gear connecting said shaft with the axle of the traveling wheels of a seeding-machine; fourth, in the combination, with a seed-cup, of a loose ring having a rim-bearing therein, and provided with centrally and laterally projecting teeth, and a distributing-wheel having its bearing within said ring, and provided with radial projections adapted to slide between the teeth of said ring, whereby the distributing-wheel is permitted to move laterally, and is guided while so moving, as will be hereinafter more particularly explained; fifth, in combination with a laterally-moving distributing-wheel and cylindrical cut-off, a circular flange having lateral segmental projections and slots formed in it, which fit the teeth and cells of the distributing-wheel, said flange forming a revolving bearing for the wheel in the seed-cup, as will be fully described and explained hereinafter; sixth, the combination, with a seed-cup or hopper, of a distributing-wheel and a rotary cut-off, each having a bearing within said cup or hopper, and both adapted for lateral adjustment therein; seventh, in a novel construction of conical scatterers for seed-discharging tubes, said conical scatterers being provided with circular ribs or corrugations upon their surfaces, whereby the flow of seed is interrupted and deflected laterally, so that the seed are scattered over a great extent of ground in all directions.

It also consists in certain details of construction and specific combinations of devices, which will be hereinafter particularly described, and pointed out in the claims.

In the accompanying drawings I have represented only those parts of a complete working machine which are necessary to illustrate the construction and operation of my invention, and have shown one distributer attached to the driving-shaft.

In a practical working machine of this kind I employ about twelve drag-bars and hoes and five seed-distributers. I also employ a lifting-bar for the drag-bar, with devices whereby the driver, sitting upon the machine, can raise or depress all the drag-bars simultaneously, and retain them at any desired height. I also employ a seed-hopper over the seed-distributers, upon which the driver having control of the machine can sit.

These several parts do not constitute any part of my improvement and invention, and may be constructed and applied in any suitable or well known-manner.

The draft-frame consists of longitudinal beams A and transverse beams $A^1$ $A^2$, secured together and braced in any suitable manner, so as to form a strong frame for receiving and supporting the seed distributing and covering machinery. I have represented only so much of this draft-frame as is necessary to illustrate one of the seed-distributers and the hoes belonging thereto.

B represents one of the transporting-wheels, which is keyed fast upon its axle C, so as to turn this axle when the machine is moved along; and N represents a long spur-wheel, which is applied loosely upon the axle C, but engaged therewith by means of a clutch, consisting of the toothed hub *n* and a correspondingly-toothed drum, $n^1$. This drum $n^1$ is applied upon its axle C, so as to turn therewith at all times, by means of the key-tenon $n^2$, (shown in Fig. 3,) and this drum is moved up to and from the hub *n* of wheel N by means of a lever, P, one end of which embraces the drum, and has steel pins fitted into an annular groove made therein, as shown.

Lever P is pivoted to the bottom side of the rear beam, A, of the draft-frame, and extends out in rear thereof, as shown in Fig. 1.

Beneath the draft-frame, and firmly bolted thereto, is a metal frame, L, which is constructed with bearing or journal boxes for the axle C to turn in, and on each side, outside of the draft-frame, is a casting, E, which is bolted rigidly in place and affords a pivoted attachment for a seed-hopper, (not shown in the drawings;) also, a flanged dirt-guard for the axle C, and also a rear bearing for supporting the rod $D^2$, to which the drag-bars are pivoted, as shown in Figs. 1 and 2.

The rear extension, *c*, is set outward from the main portion of its plate E, as shown in Fig. 1, for the purpose of allowing the drag-bar D to be brought as near the side of the wheel B as possible without touching this wheel. Between these lateral offset bearings *c* there may be interposed auxiliary bearings, as at $E^3$, for strengthening and stiffening the rod $D^2$.

The drag-bars D are pivoted at their front ends to this rod $D^2$, and properly spaced by means of cylindrical tubes or blocks $D^3$, as shown in Fig. 1. These drag-bars have free vertical motions, and carry hoes $D^4$ near their rear ends for stirring the soil and covering in the seed.

I will describe the manner of constructing and applying the hoes after I have described the devices invented by me for discharging the seed.

The teeth of the long spur-wheel N above described engage with the teeth of a pinion-wheel, $K^1$, which is keyed fast upon a shaft, K, that extends transversely across the draft-frame, and has its bearings upon the upper side thereof, as shown in Figs. 1 and 3.

On one side of the wheel $K^1$ is an annularly-grooved hub, $K^2$, in the grooves of which studs are fitted loosely, which studs are upon the yoked end of a lever, $K^3$, as shown in Fig. 1. By means of this lever $K^3$ the rod R can be moved endwise without disengaging the wheels N $K^1$, and by means of a nut, *k*, applied upon the fulcrum-pin of said lever, as shown in Fig. 1, this lever and the shaft can be held so that they will rotate in any desired position longitudinally. Upon this shaft K the seed-distributers J, with their cylindrical cut-offs J′, are secured. There will be as many seed-distributers upon the shaft K as there are discharge-apertures from the hopper, and, as all the distributing devices are constructed exactly alike, I shall describe and illustrate but one.

The seed is received from the seed-box or main hopper into a flaring chamber or throat, *d*, which is formed in the upper section of the distributer, as shown in Figs. 1, 2, 3, and 6, which throat flares upward, and is of such a size and depth as to prevent short straws and sticks from finding a lodgment in it. The seed-cup may be also constructed with a hollow elevation, $d^2$, extending upon one side of its throat *d*, and forming a chamber for receiving a packing, *f*, of india-rubber or other suitable substance, which may be held in place by a wedge-block, *e′*, and expelled by inserting a pin through the hole *e*. (Shown in Figs. 2 and 6.) This packing is designed to press upon the surface of the rotary distributer J and cylindrical cut-off J′, and sweep back the seed, so as to prevent it from escaping too rapidly. The seed-cup or distributer is preferably made of two horizontal sections, F and G. Together they form a bearing for the revolving seed-wheel and shaft carrying the wheel. The seed-cup is also constructed with an enlarged free discharging-passage, $f^1$, extending down in rear of the distributer into the open space which is below the said distributer. This open space is arranged directly over the seed-tube H, and the seed is guided therein by the trough-shaped extension $f^2$ of bearing G. The front as well as the side wings of the cup and its bearing are circular, for receiving the distributer, and fitting snugly against it, so as to prevent any seed escaping from the throat *d* except through the passage $f^1$, as described.

On one side of the bearing G a circular channel is formed by the lip *o′*, through the bottom of which is an opening, *h*, communicating with the opening through the main portion of the bottom of this bearing. (Shown in Figs. 3 and 5.) In this channel is a circular flange, S, having segmental projections S′ on one end of it, and an opening through it corresponding in shape to the toothed distributer J, so as to allow the teeth thereof to move longitudinally through it when shaft K is adjusted by means of the lever $K^3$. The segments S′ on the flange S are shaped so as to fit into the spaces between the teeth of the distributer, and to abut snugly against the ends of the cylindrical cut-off J′ when this latter is moved freely beneath the throat *d* of the seed-cup, as shown in Figs. 3 and 5.

The seed-cup, as above described, is cast separate and fitted together, as shown in the drawings, and secured across the space between the two parallel beams $A^1$ $A^2$ by means of screws, or in any other suitable manner.

Within the circular space which is formed by the seed-cup is fitted the device for regulating the discharge of the seed from the throat *d* and for cutting off the discharge completely. This device consists of the toothed wheel J and a plane-faced cylindrical portion, J′. The toothed portion affords the seed-cells, for discharging seed from the throat in greater or less quantities, according as more or less of them are exposed beneath this throat, and the cylindrical portion J′ serves as a means for closing the said throat. This distributer and cut-off is bored out somewhat larger than the diameter of the shaft K, and when applied upon this shaft it is attached to it by a cross-pin, *t*, (shown in Fig. 3,) which passes loosely through the shaft and tightly through the distributer and cut-off. Beneath the openings through the bottom of the seed-cup is the tapering seed-tube H, which is secured to the beams $A^1$ $A^2$, and extended down in front of the axle C a proper distance. This tube H has a cone scatterer, I, suspended beneath its discharge end by the pendants *g*, upon which cone the seed fall, and are spread and scattered over the ground in every direction. To effect this scattering of the seed more perfectly, I form annular ribs *g′* upon the surface of said cone, as shown in Figs. 2 and 3, which will interrupt the streams of seed, and scatter them uniformly and over a large surface of ground.

Each one of the hoes $D^1$ is of a lozenge shape, and is secured to a standard, $D^1$, which passes through an oblong slot through the drag-bar D. The standard $D^1$ is pivoted to the drag-bar by a transverse bolt, $a^2$, and constructed of the form substantially as shown in Figs. 2 and 7, with its front portion, $a^1$, curved in the form of a segment, and provided with a clamp, which serves as a stop to resist all ordinary backward pressure against the hoe. This clamp or stop consists of a forked casting, $b^1$, which partly embraces the portion *a* on top of the drag-bar D, and which is constructed with an eye-piece, *b*, upon it, through which the screw-threaded end of a hooked bolt, $b^2$, passes. The hook of this bolt embraces the curved portion $a^1$ of the standard $D^1$, and the straight portion receives upon it a nut, by means of which the device can be clamped firmly to the standard. By loosening this nut the standard can be adjusted above its pivot $a^2$, and set to run at any desired pitch or inclination. Should the hoe strike an obstruction in its path which might break or derange the machine, the clamp-stop will allow the standard $D^1$ to slip backward, and thereby pass unimpaired over such obstruction.

Having described my invention, what I claim as new, and desire to secure by Letters Patent, is—

1. A secondary hopper or seed-cup having a distributing-wheel supported by bearings within the seed-cup, in combination with devices for shifting said wheel laterally for regulating the sowing capacity of the said seed-cup, substantially as set forth.

2. A secondary hopper or seed-cup supporting a seed-wheel turning on bearings in said hopper, and having a laterally-moving cut-off to widen or narrow the carrying-surfaces of the distributing-wheel, substantially as set forth.

3. A secondary hopper or seed-cup, in combination with a rotating laterally-adjustable distributing-wheel arranged within said hopper or cup, and a rotary shaft connected with and passing through the center of said wheel, substantially as set forth.

4. The combination, with a seed-cup, of a loose ring having a rim-bearing therein, and provided with centrally and laterally projecting teeth, and a distributing-wheel having its bearing within said ring, and provided with radial projections adapted to slide between the teeth of said ring, substantially as set forth.

5. In combination with a laterally-moving distributing-wheel and cylindrical cut-off, a circular flange, having lateral segmental projections and slots formed in it, which fit the teeth and cells of the distributing-wheel, forming a revolving bearing for the wheel in the seed-cup.

6. The combination, with a seed-cup or hopper, of a distributing-wheel and a rotary cut-off, each having a bearing within said cup or hopper, and both adapted for lateral adjustment therein, substantially as and for the purpose set forth.

7. The combination, with the seed-cup, having throat *d*, and rotary annular bearing *s*, having the inward and lateral projections *s′*, of the cylindrical cut-off J′ and the toothed distributer J, substantially as described.

8. While not claiming conical scatterers, I do claim constructing conical scatterers I for seed-discharging tubes, with circular ribs or corrugations upon their surfaces, substantially as described.

9. The shaft K, having the seed-wheels mounted thereon, and supported by bearing in seed-cup F, in combination with the lever $K^3$, for adjusting the seed-wheels laterally in their cups, substantially as set forth.

In testimony whereof I have hereunto set my hand.

GEO. ESTERLY.

Witnesses:
ARTHUR PEARSON,
E. P. BURROWS.